United States Patent [19]
Komolrochanaporn

[11] Patent Number: 5,466,019
[45] Date of Patent: Nov. 14, 1995

[54] PIPE COUPLING

[76] Inventor: Naris Komolrochanaporn, 119 Soi Wat suthavas, Bukkalo, Dhonburi, THX

[21] Appl. No.: 312,055

[22] Filed: Sep. 26, 1994

[51] Int. Cl.⁶ .................................................... F16L 19/12
[52] U.S. Cl. .......................... 285/343; 285/382.7; 285/339
[58] Field of Search ................................. 285/342, 343, 285/341, 340, 323, 382.7, 104, 339

[56] References Cited

U.S. PATENT DOCUMENTS

| | | | |
|---|---|---|---|
| 2,412,664 | 12/1946 | Wolfram et al. | 285/343 |
| 2,466,526 | 4/1949 | Wolfram | 285/104 |
| 3,578,805 | 5/1971 | Dutton | 285/343 |
| 4,084,843 | 4/1978 | Gassert | 285/340 |
| 4,138,145 | 2/1979 | Lawrence | 285/343 |
| 4,431,216 | 2/1984 | Legris | 285/104 |
| 4,445,714 | 5/1984 | Kisiel, III | 285/323 |
| 4,655,486 | 4/1987 | Tarnay et al. | 285/343 |
| 4,717,179 | 1/1988 | Haberstock et al. | 285/343 |

*Primary Examiner*—Eric K. Nicholson
*Attorney, Agent, or Firm*—Jack C. Munro

[57] ABSTRACT

A pipe coupling for joining separate segments of pipe together in a fluid tight manner. A connector is fixedly secured to one pipe section with the retaining nut being movably mounted on the other pipe section. The retaining nut is to be threadably secured to the connector. In between the connector and the pipe section is located a sealing arrangement which includes a thin walled grip ring. This grip ring includes a plurality of biting members. When the retaining nut is tightened on the connector, these biting members imbed into the wall surface of the pipe section thereby longitudinally fixing the position of this pipe section relative to the connector and maintaining a fluid tight established relationship.

3 Claims, 1 Drawing Sheet

PIPE COUPLING

BACKGROUND OF THE INVENTION

1) Field of the Invention

The field of this invention relates to pipes and more particularly to a coupling for different sections of pipe which are to be connected together in a fluid tight manner without requiring welding, soldering, or other conventional types of permanent securing techniques.

2) Description of the Prior Art

Plastic pipe and metal pipe have long been used in the conveying of fluids such as liquids and gases. These pipes include fittings with these fittings being utilized to connect together aligned different sections of pipe. These fittings must be capable of providing a fluid tight seal over a range of temperatures, pressures and a variety of exterior ambient conditions. Specifically for plastic pipe, a reliable coupling is difficult due to stress causing fatigue, stretching or failure of the plastic pipe that will result in leaking of the coupling from an inadequate seal. Couplings used in plastic pipe must be able to withstand axial stresses such as those caused by temperature induced length variations without a decrease in sealing capabilities. In addition, pipe couplings should be easily connectable by ordinary workers that don't require any special skill in order to install the coupling.

Pipe couplings are currently available in many different configurations. The typical coupling includes a body or connector portion into which an open end of a section of pipe is inserted and fixedly secured within that connector. A retaining nut is movably mounted on another section of the pipe with its open end to then be located within the confines of the connector. The retaining nut is then threaded onto the connector. Included within the connector and encircling the pipe are one or more elastic sealing rings, one or more washers, and a grip ring for longitudinally fixing in position the pipe section that has been inserted within the connector. Tightening of the retaining nut onto the connector forces this grip ring to compress radially inward to grip the wall surface of the pipe and also provide a longitudinal pressure against the sealing rings to compress such and form a fluid tight seal between the exterior wall surface of the pipe and the interior of this coupling. In the past, typical coupling designs include a grip ring that must be initially expanded radially during insertion of the pipe so as to fit around and grip the pipe. This initial radial expansion makes insertion of the pipe more difficult and creates a locking condition that prevents withdrawal of the pipe except by dissembling of the coupling even though the retaining nut has not been tightened. Also the gripping rings of the prior art have not been constructed to be readily flexible as they have a substantially thick walled surface. Flexibility is important to maximize the gripping force between the grip ring and the wall surface of the pipe.

Also, in the past, these pipe couplings have been designed to be employed only in conjunction with plastic pipe. It was not considered feasible to utilize a grip ring in conjunction with the metallic pipe prior to the present invention.

SUMMARY OF THE INVENTION

A pipe coupling which utilizes a connector which is fixedly secured onto a first section of pipe. This connector includes an internal bore which is surrounded by an externally threaded section. Within the internal bore is located an O-ring seal, a washer, a grab ring and a wedge ring with the grab ring being mounted between the wedge ring and the washer. The grab ring includes a plurality of biting members which are deflectable radially due to the inclusion of slots and holes formed within the grab ring. A retaining nut is movably mounted on an opposite section of pipe and within this section of pipe is to be interiorly located a thin metal sleeve which fits inside this pipe to act as a stiffener for the pipe in the area where the pipe is gripped and sealed by the coupling. This open end of the pipe, which contains the sleeve, is then located within the interior of the connector with the washer, grab ring and wedge ring being located against the exterior wall surface of this pipe section. When the retaining nut is threadably tightened onto the connector, the O-ring seal is compressed forming a fluid tight seal between the pipe coupling and the pipe section. The biting members are deflected inwardly and imbed into the surface of the pipe section which longitudinally fixes in position the pipe section relative to the coupling thereby insuring that the pipe section remains in the position where the seal is compressed and the fluid tight seal is maintained regardless of changing ambient conditions.

The primary objective of the present invention is to construct a pipe coupling that is usable for both plastic pipe and metal pipe for joining aligning sections of such pipe in a fluid tight manner.

Another objective of the present invention is to construct a pipe coupling that compensates for conditions such as variations in wall thickness of the pipe and stretching of the pipe due to axial stress.

Another objective of the present invention is to construct a pipe coupling which can be easily installed with simple tools not requiring any special skills by the installer.

Another objective of the present invention is to construct a pipe coupling that can be manufactured in different sizes and thereby can be used to connect different sizes of pipe from small diametered pipes to large diametered pipes.

DETAILED DESCRIPTION OF THE PREFERRED EMBODIMENT

Figure 1:
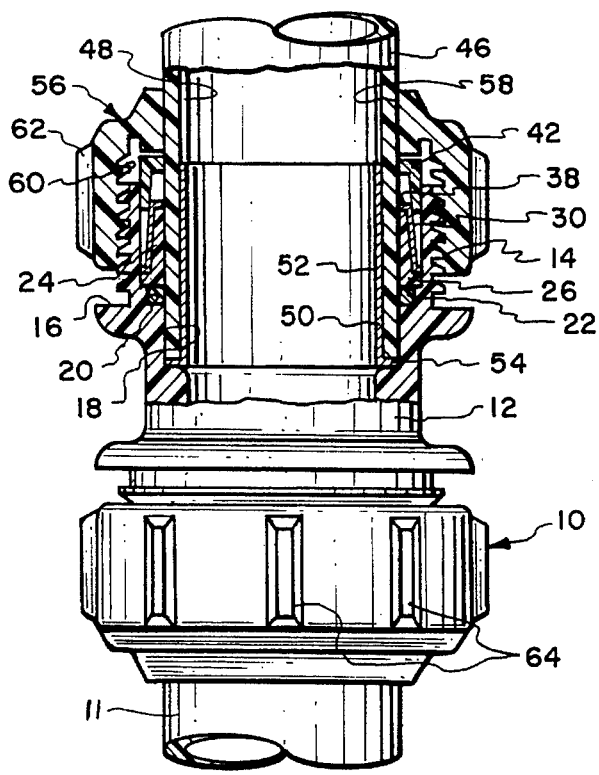
FIG. 1 is a longitudinal view, partly in cross section, of the pipe coupling of the present invention showing such installed in conjunction with two aligned and separate pipe sections with the coupling in an untightened position that permits longitudinal movement of one of the pipe sections relative to the coupling.
Figure 2:
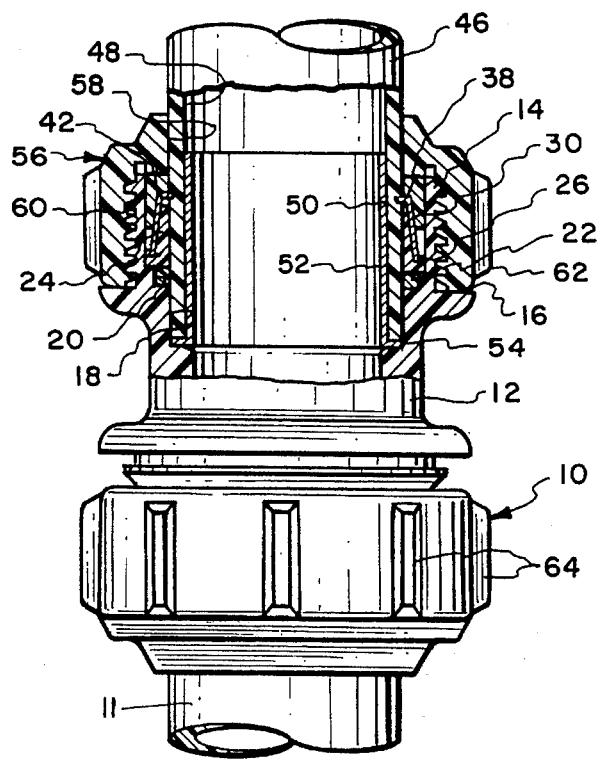
FIG. 2 is a view similar to FIG. 1 but showing the pipe coupling in the tightened position, thereby fixing in position the movable pipe section relative to the coupling.
Figure 3:
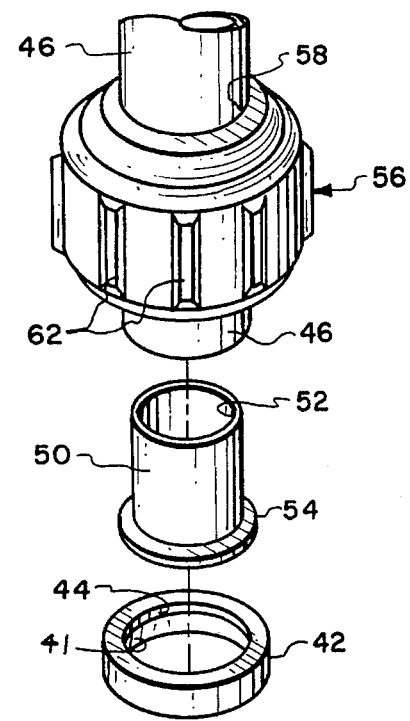
FIG. 3 is an exploded isometric view showing the different parts of the pipe coupling of the present invention.
Figure 3:
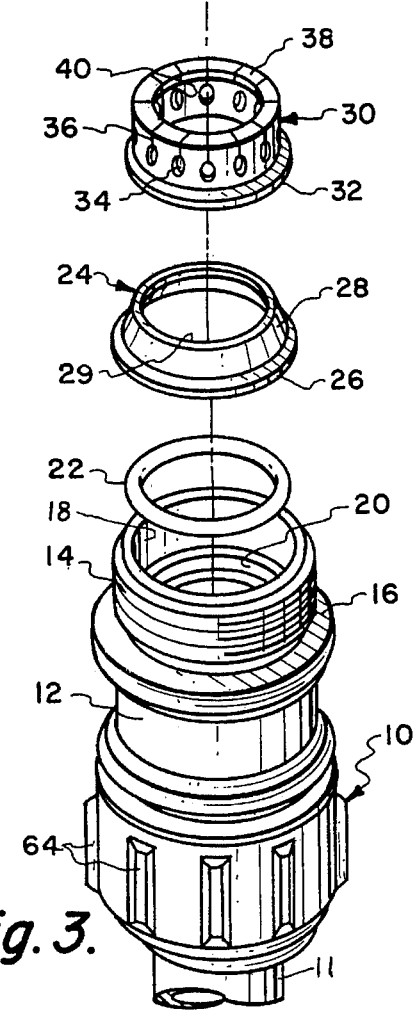

Referring particularly to the drawing there is shown the pipe coupling of the present invention which is generally composed of a pipe connector 10 and a retaining nut 56. Pipe connector 10 is basically hollow and is open at each end. Fixedly mounted within the lower end of the connector 10 is a first section 11 of pipe. This section 11 of pipe can comprise either plastic or metal. The diameter of the pipe 11 could be from one inch or less or could be as great as a foot or more in diameter. The first section 11 is fixedly secured as by adhesive to the pipe connector 10.

The pipe connector 10 includes a spool section 12 which terminates in its outer end in a flange 16. Extending from the flange 16 is an externally threaded section 14. Within the externally threaded section 14 is an internal bore 18. The wall surface of the internal bore 18 has a sealing groove 20. Locatable within the sealing groove 20 is an O-ring seal 22. The O-ring seal 22 will normally be constructed of a rubber or plastic material.

Mounted within the internal bore 18 is a washer 24. Washer 24 includes a bottom flange 26 which rests directly against the O-ring seal 22. The washer 24 also includes internal opening 29 and an exterior tapered sidewall 28. In physical contact with the sidewall 28 is the inner surface of a grip ring 30. Grip ring 30 has a bottom flange 32 and a sidewall that includes a plurality of spaced apart enlarged holes 34. Connecting with each enlarged hole 34 is a slot 36. Each slot 36 connects with the upper edge of the grip ring 30 and as a result there is formed a plurality (actually twelve in number) of biting members 38. The upper edge of the grip ring 30 is basically in the shape of an annular flange similar in shape to flange 32 with the difference being that the annular flange extends inwardly toward the pipe section 46 where the bottom flange 32 extends outwardly toward the externally threaded section 14. The biting members 38 enclose a circular shaped opening 40. Biting members 38 have an outer sharpened edge, the purpose of which will be explained further on in this application.

It is to be noted that the washer 24 is formed of a compressive material with generally a rubber material being preferred. The washer 24 is to support the inside surface of the grip ring 30. The biting members 38 are located externally of the washer 24.

The internal opening 44 of a wedge ring 42 is to be located about the grip ring 30 and in contact of the exterior surface of the grip ring 30. The wedge ring 42 is to be constructed of a rigid material with generally a plastic being preferred. The bottom part of the internal opening 44 forms an annular tapered surface 41. The exterior surface of the grip ring is to be in direct contact with this annular tapered surface 41.

The retaining nut 56 is slipped over a second pipe section 46. This second pipe section 46 is to be of the same diameter as the first pipe section 11. Within the opening end of the second pipe section 46 there is to be located a sleeve 50. The sleeve 50 has an outwardly extending annular flange 54 with the open end of the pipe section 46 coming into direct contact with the flange 54. Internally of the sleeve 50 is a through opening 52. The through opening 52 connects with the interior chamber 48 of the pipe section 46. This sleeve 50 is thin walled and restricts the flow of fluid through internal chamber 48 only minimally. The sleeve 50 functions to support the open end of the second section of pipe 46.

The retaining nut 56 has an internal bore 58 within which is located the pipe section 46 in a snug fitting manner. However, the retaining nut 56 can be moved on the pipe section 56. The internal bore 58 includes an enlarged bored out area that includes internal screw thread 60. Mounted on the exterior surface of the retaining nut 56 are a plurality of protuberances 62. The protuberances 62 facilitate manual rotation of the retaining nut 56. In a similar manner protuberances 64 are formed on the exterior surface of the pipe connector 10. The protuberances 64 facilitate manual gripping of the pipe connector 10.

When it is desired to connect together the pipe sections 11 and 46 in a fluid conducting, non-leaking path, the user initially fixedly secures by adhesive the pipe section 11 within the connector 10. The user then places the retaining nut 56 in connection with the pipe section 46 and also inserts the sleeve 50 within the open end of the pipe section 46 until flange 54 abuts against the end of the pipe section 46. The O-ring seal 22 is placed in connection with the groove 20 and the flange 26 of the washer 24 is placed against the O-ring seal 22. The grip ring is then inserted against the tapered surface 28 of the washer 24. The wedge ring 42 is then placed over the grip ring 30. The retaining nut 56 is then placed in connection with the connector 10 so that the threaded sections 14 and 60 connect. At this particular time if it was desired, the pipe section 46 could be removed and replaced from the retaining nut 56.

In order to complete the installation of the pipe coupling of this invention, the user then tightens the retaining nut 56 while holding the connector 10. This causes the surface 41 of the wedge ring 42 to apply pressure against the exterior surface of the grip ring 30. This pressure causes the independent and slightly separated biting members 38 to be pressed inwardly and actually slightly imbed within the wall surface of the pipe section 46. At the same time, the pressure that is being applied compresses the seal 22 and the washer 24. There is therefore formed a fluid tight seal between connector 10 and the pipe section 46 preventing any leakage of fluid from the internal chamber 48 of the pipe section 46 to the ambient. The fact that the biting members 38 are imbedded within the pipe section 46, longitudinal movement of the pipe section 46 relative to the connector 10 is prevented. Typical longitudinal movement would be due to temperature variations that the pipe sections 11 and 46 might be subjected to. The fact that there will not be permitted any longitudinal movement within the pipe coupling of this invention will assuredly prevent any leakage of fluid from within the pipe sections 11 and 46 exteriorly of the pipe coupling.

What is claimed is:

1. A pipe coupling for interconnecting a pair of slightly spaced apart first and second pipe sections, each said pipe section having a longitudinal center axis, each said longitudinal center axis of said pipe sections being in substantial alignment, said pipe coupling comprising:

a connector, said first pipe section being inserted within said connector and fixedly secured thereto, said connector having an outer open end defining an internal bore which is surrounded by an externally threaded section;

a thin walled grip ring mounted within said internal bore, said grip ring having a plurality of independently movable biting members, said biting members being located in a circle about said second pipe section, said biting members facing said longitudinal center axis, said grip ring having an inner surface and an outer surface, said inner surface located closest to the wall of said second pipe section;

a compressible rubber washer mounted within said internal bore, said washer located radially between said inner surface of said grip ring, and the second pipe section, said washer being spaced from said biting members, said washer providing inward resilient support for said grip ring;

a wedge ring mounted within said internal bore, said wedge ring located against said outer surface of said grip ring, said wedge ring being located directly adjacent said biting members; and a retaining nut mounted around said second pipe section, said retaining nut having an internally threaded section, said internally threaded section to engage with said externally threaded section of said connector and upon tightening of said retaining nut cause said wedge ring to apply force against said biting members of said grip ring causing said biting members to embed said second pipe section.

2. The pipe coupling is defined in claim 1 wherein:

said grip ring having a sidewall connected between said biting members and a bottom flange, said biting members forming an annular flange, said biting members being formed by a series of longitudinal slots formed within said sidewall and said annular flange, each said slot connecting with an enlarged hole formed within said grip ring, there being a separate said enlarged hold for each said slot.

3. The pipe coupling as defined in claim 2 wherein:

there being twelve in number of said biting members.

* * * * *